United States Patent [19]

McDaniels et al.

[11] Patent Number: 5,351,098
[45] Date of Patent: Sep. 27, 1994

[54] POCKET RETAINER FOR EYEGLASSES

[76] Inventors: Barry P. McDaniels; Deborah A. McDaniels, both of 12900 Washburn Ct., Burnsville, Minn. 55337

[21] Appl. No.: 882,314

[22] Filed: May 13, 1992

[51] Int. Cl.⁵ .............................................. A44B 21/00
[52] U.S. Cl. ........................................ 351/112; 24/3 C; 24/3 J; 24/3 H; 24/3 L; 24/336; 24/338; 24/535; 24/543
[58] Field of Search ................... 351/47, 48, 57, 112, 351/155, 158; 24/3 C, 3 F, 3 G, 3 H, 3 J, 3 L, 330, 331, 332, 334, 338, 459, 530, 531, 535, 542, 545, 566, 568, 570, 335, 336, 543

[56] References Cited

U.S. PATENT DOCUMENTS

| | | | |
|---|---|---|---|
| 374,702 | 12/1887 | Rand | 24/3 J |
| 806,750 | 12/1905 | Padmore | 24/3 H |
| 1,898,059 | 2/1933 | McDonald . | |
| 1,973,648 | 9/1934 | Nagel . | |
| 2,614,305 | 10/1952 | Yeardley | 24/3 H |
| 2,644,212 | 7/1953 | Markowitz | 351/112 |
| 2,766,500 | 10/1956 | Chanko . | |
| 2,818,621 | 1/1958 | Pretz . | |
| 3,010,365 | 11/1961 | Sadel | 351/112 |
| 3,038,377 | 6/1962 | Maxson | 351/112 |
| 3,210,814 | 10/1965 | Wolf . | |
| 3,588,236 | 6/1971 | Moller | 351/155 |
| 3,798,712 | 3/1974 | Bonis | 24/3 C |
| 4,496,224 | 1/1985 | Allen . | |
| 4,771,515 | 9/1988 | Guarro | 24/3 C |
| 5,129,126 | 7/1992 | Huang | 24/3 J |
| 5,235,727 | 8/1993 | McCloskey | 24/3 C |

FOREIGN PATENT DOCUMENTS

| | | | |
|---|---|---|---|
| 1162365 | 4/1958 | France | 351/112 |
| 1579837 | 8/1969 | France | 351/112 |
| 0021719 | 2/1983 | Japan | 351/112 |

*Primary Examiner*—Ricky D. Shafer
*Attorney, Agent, or Firm*—Dorsey & Whitney

[57] ABSTRACT

A pocket retainer clip for eyeglasses is provided. The retainer is designed to be carried in a pocket or the like, whereby it is available conveniently for receiving and retaining a pair of eyeglasses or spectacles in the pocket. The retainer broadly includes a pocket dip, spring operator, and an eyeglasses temple clamp.

4 Claims, 3 Drawing Sheets

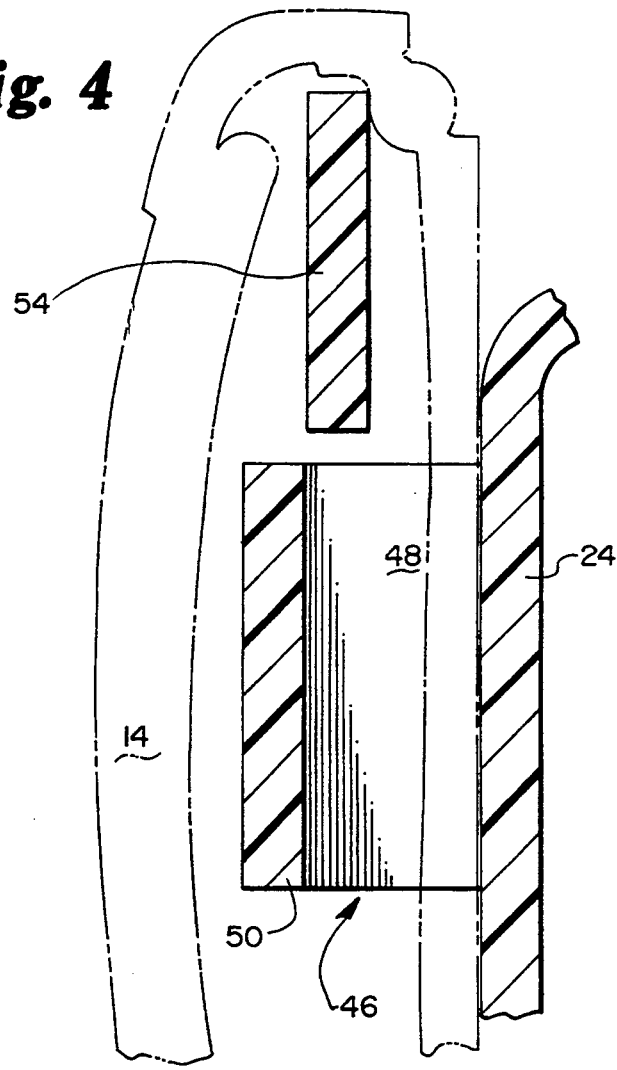
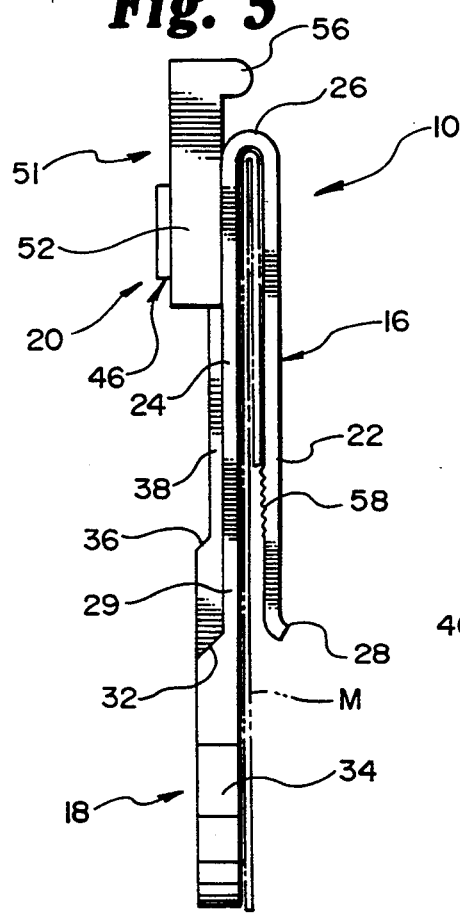
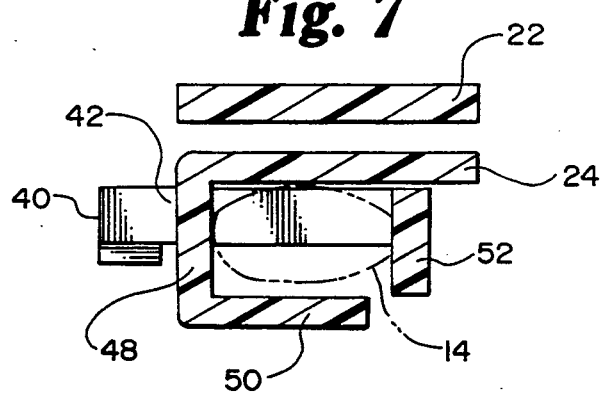

POCKET RETAINER FOR EYEGLASSES

TECHNICAL FIELD

The present invention relates to clips or holding devices. In particular, it relates to a dip retainer for being attached to and carried in a pocket, wherein the retainer may be used to hold a pair of eyeglasses safely and securely in the pocket.

BACKGROUND OF THE INVENTION

Many people have poor vision requiring them to wear eyeglasses or spectacles. For these people it is frequently convenient to take their eyeglasses off and place them in a pocket. This is particularly true for those people who make use of prescription sunglasses as well as eyeglasses with dear lenses because they switch frequently from one pair to the other. Persons who wear contact lenses also use sunglasses when outdoors or driving.

While putting one's primary eyeglasses, a pair of sunglasses or extra glasses in a pocket is convenient, there are associated problems. The most obvious problem is that if the glasses are not held securely in the pocket, particularly a shirt pocket, they will fall out and break. Further, it would be advantageous if the eyeglasses could be held in a selected position or location within the pocket, thereby increasing the ease of access and preventing them from moving around, particularly if the user is engaged in sporting activities.

The problem identified in the preceding paragraph is well known, particularly to those who use eyeglasses of various sorts. Devices purporting to solve the problem are known in the art. For example, U.S. Pat. Nos. 1,898,059 (McDonald), 1,973,648 (to Nagel), and 3,210,814 (to Wolff disclose resilient clips for connection to one of the temple bars of a pair of eyeglasses or spectacles. The dip disclosed by Nagel is an attachment for eyeglasses and is fairly representative of the prior art. It includes means for attaching and securing the clip to a temple bar of a pair of eyeglasses and a dip 28. In use, the eyeglasses are worn and removed with the attachment in place on a temple bow and the dip is dipped over any suitable pocket support or the like.

U.S. Pat. No. 4,496,224 (to Allen) discloses an eyeglass frame with a pocket clip. The frame includes a pair of interconnected rims, each of which has an outer surface and is configured to surround and support an eyeglass lens, and at least one clasp resiliently mounted on one of the rims and superimposed over at least about one third of the outer surface of one of the rims. The clasp is spaced above the outer surface of the rim over which it is superimposed to permit a portion of a user's garment to be inserted between the clasp and rim.

The above prior art patents disclose improvements in the art, but a major problem is that, in each instance, the device is designed to be fixed to, attached to or integrated with the eyeglass frame itself. Recently, eyeglasses have become a fashion or style statement, and may even be known as eyewear, having an aesthetic style and appeal. This is at least partially due to the advent of contact lenses whereby it is possible for people to wear eyeglasses or spectacles by choice rather than necessity. Further, sunglasses or other protective eyewear used for participation in sports such as skiing, golf or tennis are designed to be attractive, as well as useful. A retainer attached to eyewear, especially while the eyewear is being worn, definitely detracts from the design and style appeal of the eyewear.

Another problem with prior art spectacle clips or holders attached permanently or semi-permanently to a pair of eyeglasses is that the choice of position on the eyeglasses frame is limited. Such clips cannot be positioned in the ear or nose contacting portion of the frame because they would interfere with the user's comfort. As a result, they must be put on the temple bar or bow in relative close proximity to the hinge joining the temple to the lens carrying portion of the frame. At this location, a dip such as those disclosed by Nagel, McDonald and Wolf is visible to the user and, particularly for individuals participating in sports, becomes a distraction that interferes with performance or, in extreme cases, can cause interference with vision resulting in injury.

U.S. Pat. Nos. 2,818,621 (to Pretz) and 2,766,500 (to Chanko) disclose different types of holders or clamps for spectacles or eyeglasses. The damp disclosed by Chanko comprises a suspender in the form of a strap or similar flexible member adapted for wearing around a person's neck. At its ends the strap carries readily attachable and detachable clamps to which the temples of spectacles may be releasably attached.

The holder disclosed by Pretz is for use for the temporary support of eyeglasses on the clothing of the wearer, and is removably secured to the clothing by a pin. Basically, the Pretz holder is a tubular member and is used by inserting one of the temples of a pair of eyeglasses or spectacles into the open, upper end of the member and allowing the temple to pass through the member. While the holder disclosed by Pretz is an improvement in the prior art because it is not attached directly to the eyeglasses while they are being worn, a problem associated with the Pretz holder is that it does not provide for securely gripping or holding the eyeglasses temple within the tubular member. Thus, in almost any activity, but particularly in sporting activities, the eyeglasses may slip from the Pretz holder and be broken.

A problem common to both the Chanko and Pretz eyeglasses holder is that while in use they will be in full view rather than hidden in a pocket. Therefore, individuals conscious of style and appearance may not be optimally pleased with either the Pretz or Chanko eyeglass holders.

Clearly, an easy to use eyeglasses holder or retainer that holds a pair of eyeglasses securely and safely, yet is inconspicuous and easy to use, would be a decided improvement over the eyeglass or spectacle clips disclosed in the prior art.

SUMMARY OF THE INVENTION

A pocket retainer clip for eyeglasses is provided. The retainer is designed to be carried in a pocket or the like, whereby it is available conveniently for removably receiving and retaining a pair of eyeglasses or spectacles in the pocket. The retainer broadly includes a pocket clip, spring operator, and an eyeglasses temple or bow clamp.

An object of the present invention is to provide an easily carried, yet inconspicuous, eyeglasses or spectacles pocket retainer.

Another object of the present invention is to provide an eyeglasses retainer for use in a pocket, wherein the retainer is carried by the pocket for releasably receiving and holding a pair of eyeglasses or spectacles in the pocket.

A feature of the present invention is a finger or thumb receiving tab which facilitates the use of the retainer, yet which does not detract from the appearance of the clothing worn by a person using the retainer of the present invention.

Still another object of the present invention is to provide a pocket retainer for eyeglasses or spectacles, wherein the retainer is carried by an article of clothing worn by the user and wherein any pair of eyeglasses or spectacles, including wire-rimmed glasses, protective eyewear, spectacles with plastic frames, and various types of sunglasses, can be inserted easily into the retainer, held securely in the retainer within a pocket or the like, and removed easily and quickly from the retainer for use.

Advantages of the present invention are that it can be carried easily and inconspicuously by a person, even during participation in sports events, it securely holds a pair of any type of spectacles, and it is light in weight.

Other objects and advantages of the present invention will be understood with reference to the following specification and appended drawings and claims.

BRIEF DESCRIPTION OF THE DRAWINGS

FIG. 4 is a sectional view of the present invention taken along line 4—4 of FIG. 3 depicting a pair of eyeglasses retained by the present invention;

FIG. 5 is a side elevational view of the present invention depicting the position of the retainer dipped on a pocket, with the pocket depicted in phantom lines;

FIG. 7 is a sectional view taken along line 7—7 of FIG. 3.

DETAILED DESCRIPTION OF THE PREFERRED EMBODIMENT

Although depicted only in phantom, it should be understood that all references herein to eyeglasses or spectacles refer to vision aids or eyewear which include a conventional eyeglasses frame consisting of a pair of rims each for supporting and at least partially surrounding a lens, wherein the rims are interconnected by a nose bridge, and wherein a pair of temple bars or bows are connected to the rims for engaging a wearer's ears or head adjacent the ears. Further, it should be understood that references to such eyeglasses or spectacles includes those having variously shaped frames formed of wire, plastic or other material.

Figure 1:
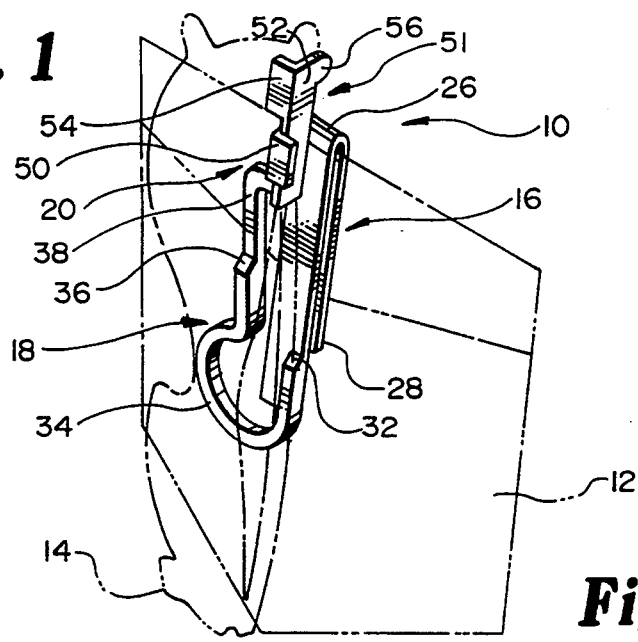
FIG. 1 is a perspective view of the present invention, with phantom lines depicting a pocket and a pair of eyeglasses.

The eyeglasses or spectacle retainer 10 in accordance with the present invention is depicted in FIG. 1 carried by a pocket 12 (depicted in phantom lines). A pair of eyeglasses or spectacles 14 is depicted in phantom lines positioned within the pocket 12 and retained therein by the retainer 10. The retainer 10 broadly includes a pocket dip base 16, a spring operator 18 and a eyeglasses damp 20.

Figure 2:
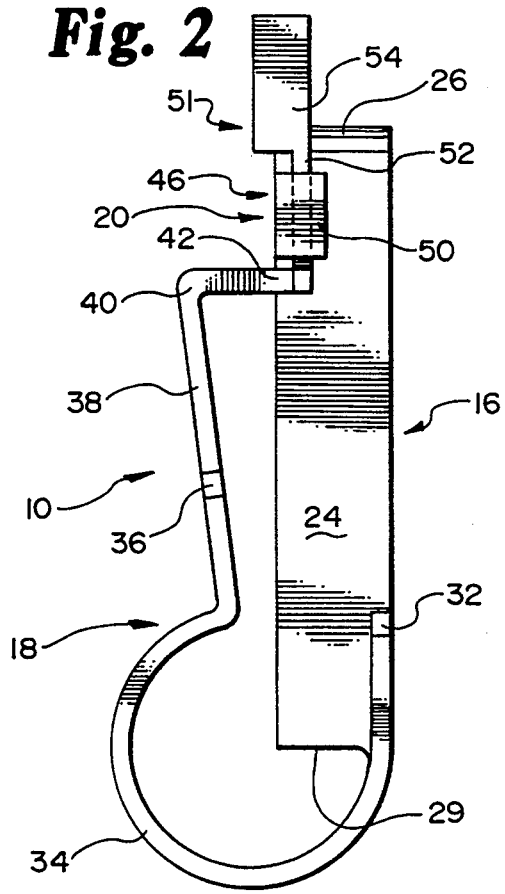
FIG. 2 is a front elevational view of the present invention.

Referring to FIGS. 2 and 5, the dip base 16 of the present invention is generally rectangular and U-shaped, comprising a first generally flat outside clip leaf member 22 and a parallel, complementary inside dip leaf member 24. The two members 22, 24 are interconnected by a curved, resilient base area 26 of the pocket dip base 16. The outside clip member 22 terminates in a free end 28. At the adjacent free end 29 of the dip member 24, the eyeglasses retainer 10 includes a integral beveled spring shoulder 32. The spring shoulder 32 is carried integrally by the member 24 and is angled at approximately 120-140 degrees obtusely upwardly and outwardly from the flat surface of the clip member 24, with an angle of 135 degrees being preferred. The shoulder 32 leads into a curved, generally circular resilient spring 34, part of the spring operator indicated generally at 18.

Figure 3:
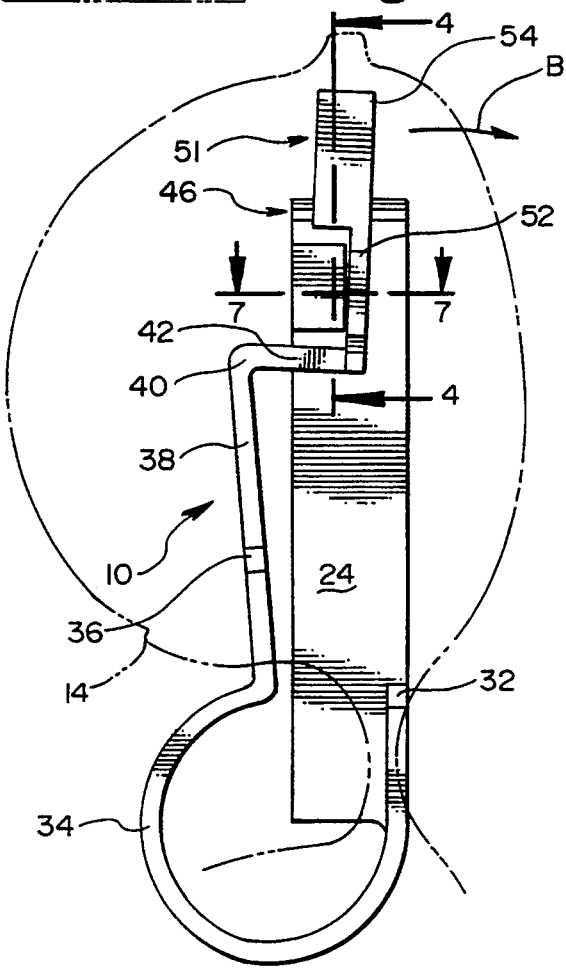
FIG. 3 is a front elevational view of the present invention depicting the position of a pair of retained eyeglasses.

Referring to FIG. 5, the spring 34 is of substantially greater thickness than the pocket dip members 22, 24 to provide durability for repeated flexure and to generate sufficient spring tension. The second end of the spring 34 terminates in a second beveled shoulder area 36, substantially identical to the bevel shoulder area 32. At the bevel shoulder area 36, angled at an angle substantially identical to the angle of the first shoulder 32, the spring 34 tapers and is connected to an elongated spring connector arm 38 having a cross-sectional area less than that of the spring 34. Referring to FIGS. 2 and 3, the spring connector arm 38 includes acutely angled elbow area 40 and terminates with a damp connector portion 42 lying in a plane generally parallel to the flat sides of the base clip 16 and generally perpendicular to the side edges of the base clip 16. The clamp connector portion 42 is operably connected to the eyeglasses temple clamp 20.

Referring to FIGS. 4, 5 and 7, the damp 20 includes a fixed temple or bow jaw 46. The bow fixed jaw 46 is fixedly mounted on the pocket clip member 24 and includes an outstanding rigid shoulder portion 48 and a flange or table portion 50. The table portion 50 is generally parallel to the side of the base dip member 24. The clamp 20 also includes a movable jaw 51 continuous with the spring operator 18 and comprising pressure pad 52, substantially equal in width to the distance that the shoulder 48 extends from the pocket clip member 24 of the base clip 16. Generally orthogonal to the pressure pad 52, the movable jaw portion 51 of the damp 20 includes an upper restraint tab 54. The outwardly facing surface area of the upper restraint tab 54 is substantially equal to the outwardly facing, exterior surface area of the table or flange 50 of the fixed jaw 46. A finger or thumb receiving actuator or operator tab 56 extends from the uppermost free end of the spring operator 18, specifically the pressure pad 52 thereof.

Figure 6:
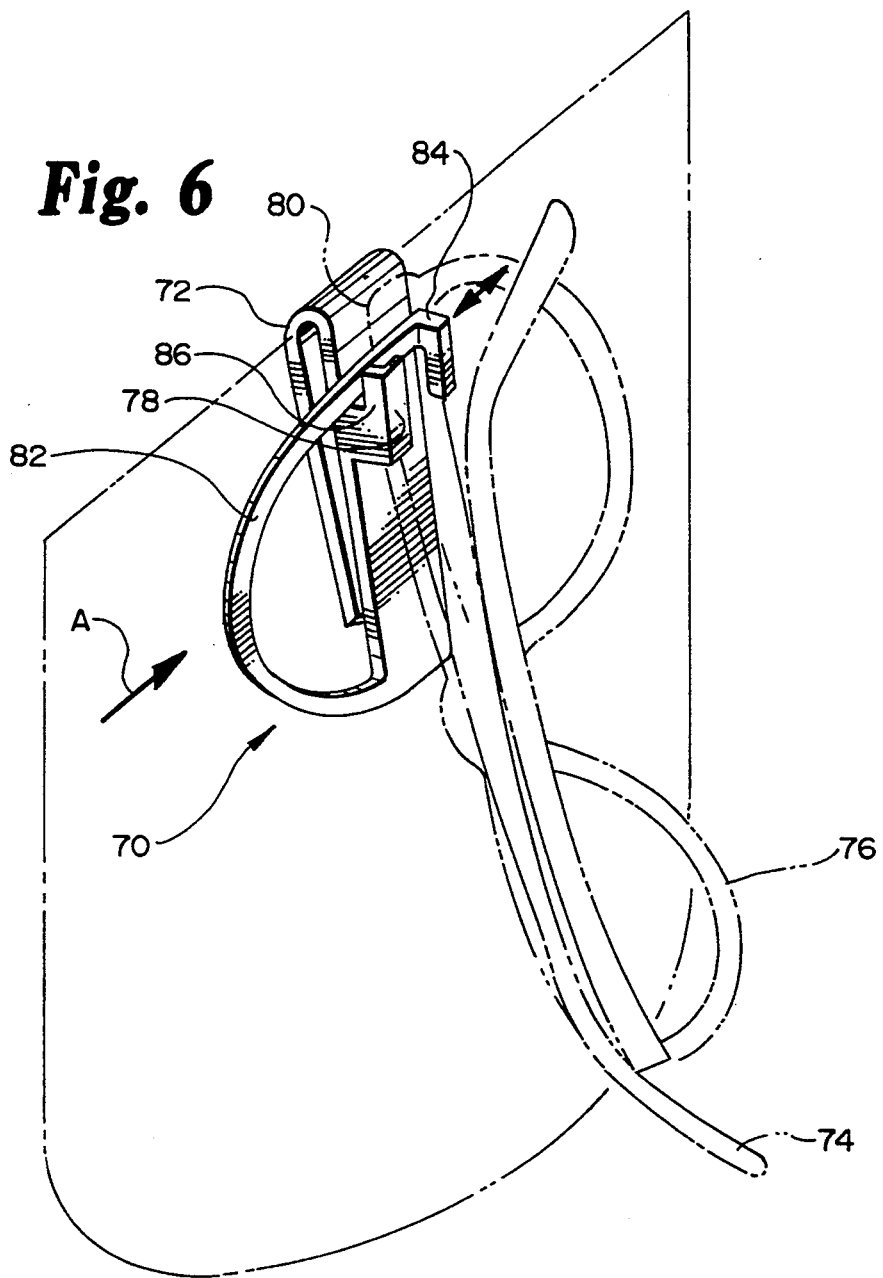
FIG. 6 is a perspective view of a modified form of the present invention.

Referring to FIG. 6, a modified embodiment 70 of the present invention is depicted. The modified dip 70 includes a pocket base dip portion 72 substantially similar to the base dip 16 of the first embodiment 10. The dip 70 pinches onto one of the temples 74 of a pair of typical eyeglasses 76. The temple 74 seats beneath a flange 78 of a bracket, indicated at 80. The pinching force seating the temple 74 beneath the flange 78 is provided by a curved or bowed spring arm 82 which biases and carries a movable pinching bracket 84 toward and against the fixed bracket 80. The spring arm 82 extends from the bottom of the clip base 72 and loops back through a notch 86 in the fixed bracket 80. The clip base 72 is generally U-shaped and folds over itself to clip to the top edge of the typical pocket (the pocket is shown in phantom lines). In use, the spring arm 82 is pressed in the direction of arrow A to expand the distance between the movable bracket 84 and the fixed bracket 80, so that the temple 74 of a pair of eyeglasses 76 can be inserted therebetween beneath the flange 78. When the pressure on the spring arm 82 is released, the temple 74 is pinched or seated beneath the flange 78 between the brackets 80, 84.

Similarly, with regard to the first embodiment depicted in FIGS. 1–5 and 7, the clip 10 is carried in a pocket 12 as shown in FIG. 1. In use, the finger tab 56 is used to move the upper restraint tab 54 and the entire movable jaw portion 51 of the clamp 20 in the direction of arrow B (shown in FIG. 3). This enables the eyeglasses wearer to insert a temple between the fixed bow jaw 46 and the pressure pad 52. Releasing the finger tab 56 causes the spring 34 to bias the pressure pad 52 in the direction of the fixed jaw 46 pinching or trapping the temple bow between the shoulder 48 and the pad 52 under the flange or table 50. The angled area 40 allows the pressure pad 52 and the shoulder 48 to remain generally parallel. The upper restraint tab 54 and the pressure pad 52 assist in maintaining the position of the eyeglasses in the clip 10, as depicted in FIGS. 4 and 7. For removing the eyeglasses, the tab 56 is simply moved in the direction of arrow B. The base dip 16 will keep the clip 10 in the pocket of the user as depicted in FIG. 5.

With reference to FIGS. 2, 4 and 7, it should be appreciated that the orthographic arrangement of the various component parts of the operating spring 18, the damp 20, including particularly the upper restraint tab 54 and the pressure pad 52 of the movable jaw 51, and the fixed jaw 46, enable the retainer clip 10 of the present invention to securely hold the pair of eyeglasses in a pocket at a selected location.

As shown in FIG. 5, the free end 28 of the pocket clip member 22 may be outwardly curved to facilitate its insertion over the edge of pocket material M. The inside surface of either or both of the clip members 22, 24 may be provided with serrations or teeth 58 to enhance the grasp of the clip 10 on a pocket.

Any suitable material, including metal, alloys thereof, fiberglass, plastic or vinyl, plastic being the preferred material, may be used to form all or a portion of the eyeglasses retainer 10 of the present invention, provided that the selected material is sufficiently rigid, strong and resilient to provide the required, repeated spring action. The spectacle contacting portions of the damp 20 may be provided with coatings or surfaces that enhance their grip on spectacles, and the present invention may be embodied in other specific forms without departing from the spirit or attributes thereof.

What is claimed is:

1. An eyeglasses retaining clip for use in a pocket for releasably receiving and retaining a pair of eyeglasses in the pocket, said clip comprising:

a generally U-shaped pocket clip base including two generally rectangular, thin, flat parallel leaf members, each having two ends and being joined at one end by a resilient curved connecting portion, one of said members carrying an outstanding fixed eyeglasses contacting jaw; and a spring arm having two ends, a first end connected to one of said leaf members and a second end carrying a moveable eyeglasses contacting jaw, wherein said fixed and moveable jaws each have an eyeglasses contacting surface, said spring arm includes a curved portion and an angled portion, wherein said eyeglasses contacting surfaces are generally parallel, and further wherein said curved portion is between a first beveled shoulder connected to said one member carrying said fixed eyeglasses contacting jaw and a second beveled shoulder adjacent to said angled portion.

2. The retaining clip according to claim 1 wherein said curved portion is generally circular and has a cross-sectional area greater than the crosssectional area of the rest of said spring arm.

3. The retaining clip according to claim 1, wherein said movable eyeglasses contacting jaw carries a finger-receiving operator for moving said jaw.

4. The retaining clip according to claim 1, wherein at least a portion of one of said leaf members is serrated.

* * * * *